United States Patent [19]

Walker et al.

[11] Patent Number: 4,520,504
[45] Date of Patent: May 28, 1985

[54] INFRARED SYSTEM WITH COMPUTERIZED IMAGE DISPLAY

[75] Inventors: Ronald P. Walker, Kirtland AFB, N. Mex.; John D. Rex, Chelmsford; John H. Schummers, Concord, both of Mass.

[73] Assignee: The United States of America as represented by the Secretary of the Air Force, Washington, D.C.

[21] Appl. No.: 403,246

[22] Filed: Jul. 29, 1982

[51] Int. Cl.³ .......................... G06K 9/00; H04N 7/18
[52] U.S. Cl. ...................................... 382/1; 250/330; 250/334; 358/113; 382/50; 382/58
[58] Field of Search ................ 358/113; 250/330, 332, 250/334; 382/1, 50, 58

[56] References Cited

U.S. PATENT DOCUMENTS

| | | | |
|---|---|---|---|
| 3,798,366 | 3/1974 | Hunt et al. | 358/113 |
| 3,868,508 | 2/1975 | Lloyd | 250/330 |
| 3,967,121 | 6/1976 | Redman | 250/330 |
| 4,010,365 | 3/1977 | Meyers et al. | 250/334 |
| 4,020,344 | 4/1977 | Kerschbaum | 250/330 |
| 4,063,093 | 12/1977 | Astheimer et al. | 250/330 |
| 4,280,050 | 7/1981 | Callender et al. | 250/330 |
| 4,366,381 | 12/1982 | Fischer et al. | 358/113 |
| 4,419,692 | 12/1983 | Modisette et al. | 358/113 |

OTHER PUBLICATIONS

Larrowe, "A Moving Window Display for Infrared Imagery", *Proc. of 7th Int. Symposium on Remote Sensing of Environment:* Ann Arbor, May, 1971.
"Design, Construction, and Demonstration of a Portable Infrared Imaging System for Remote Analysis of Heat Losses from Structures", Dec. 1980.

*Primary Examiner*—Leo H. Boudreau
*Attorney, Agent, or Firm*—Donald J. Singer; Bernard E. Franz

[57] ABSTRACT

Analog signals representing infrared radiation from an object are generated by a scanner. These signals are digitized and one frame of data is stored in a computer. The computer and a display generator process the data, and supply one frame to a TV monitor which displays an image of the object. A grey scale is also displayed alongside the image to provide calibrated quantitative information related to the temperature at different places of the object. A tape recorder may be used to record the analog signals, for later digitizing and displaying the images.

16 Claims, 6 Drawing Figures

INFRARED SYSTEM WITH COMPUTERIZED IMAGE DISPLAY

RIGHTS OF THE GOVERNMENT

The invention described herein may be manufactured and used by or for the Government of the United States for all governmental purposes without the payment of any royalty.

BACKGROUND OF THE INVENTION

This invention relates to a system which generates computerized display images of infrared scenes.

There are several techniques for measuring the flow of heat out of structures, piping, etc. Some techniques require that sensors be attached to the surfaces of interest whereas others only require scanning of the surfaces with special remote sensing devices. The former can become labor intensive due to the need for personnel to perform the attachment of sensors on the surfaces being observed. Depending upon the degree of precision desired in mapping the heat flow out of large or complex surfaces, the costs of sensor installation can mount up quickly. Use of remote sensing devices offers the potential for minimizing technical staffing but equipment sophistication and capital expense can prove to be a detriment.

There are known video viewers which are relatively simple and inexpensive, but which only provide real time imagery which cannot be calibrated in its raw form nor can it be saved for later use.

Some patents of interest include Astheimer et al Pat. No. 4,063,093 which discloses an infrared vidicon tube system which includes single frame storage and a television display. Callender et al Pat. No. 4,280,050 shows a viewer for use in the infrared portion of the spectrum which has a minicomputer connected to its output. Kerechbaum Pat. No. 4,020,344 discloses recording the output of an infrared scanner on a continuous strip map; and Redman Pat. No. 3,967,121 discloses recording infrared on a moving film.

SUMMARY OF THE INVENTION

An object of the invention is to provide a system in which detected signals from an infrared scanner can be used to provide a calibrated display, and by which the data can be stored for later use.

In the system according to the invention, image signals originating from an infrared scanner are transformed into a digitized form for storage in a computer and manipulated to produce a calibrated display.

This transforms the merely qualitative utility of such a scanner into a quantitative capability allowing analysis of heat energy losses from structures of interest with only modest investments in capital equipment.

REPORT

The construction and testing of a system as shown in FIG. 1 is described in an unpublished report, "Design, Construction, and Demonstration of a Portable Infrared Imaging System for Remote Analysis of Heat Losses from Structures", by Ronald P. Walker, a copy of which is attached hereto as an appendix, and hereby incorporated by reference.

DETAILED DESCRIPTION

1. Introduction

Figure 1:
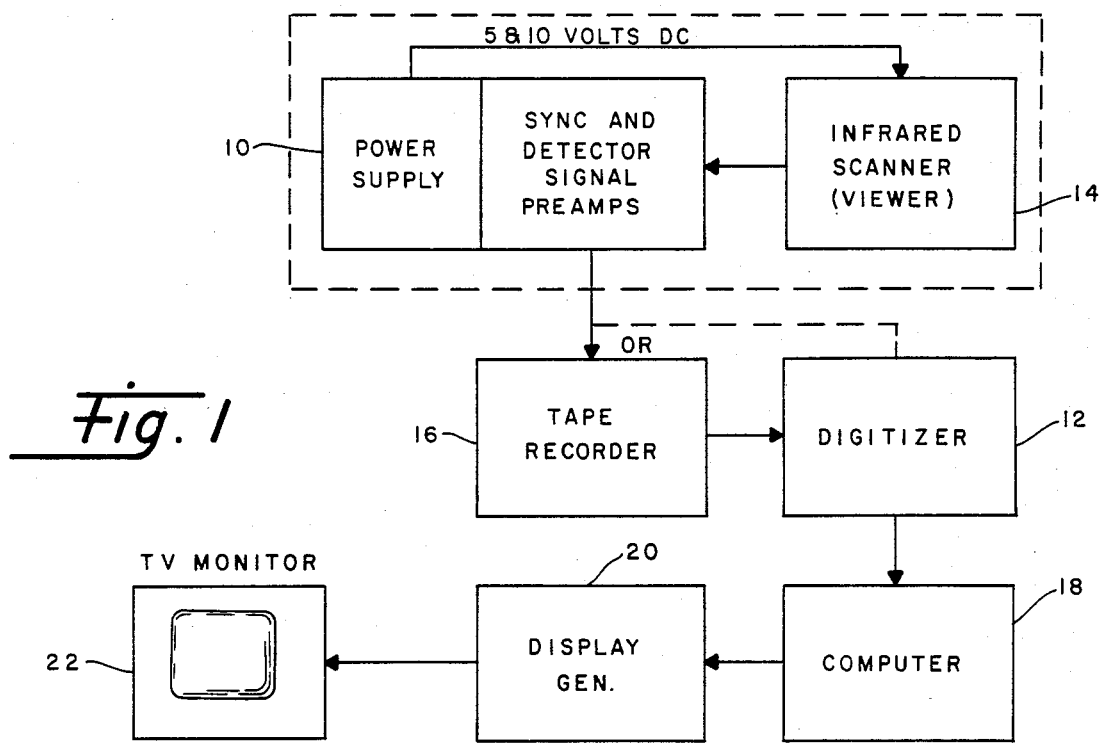
FIG. 1 is a block diagram of the system.

Referring to FIG. 1, two electronic modules 10 and 12 are designed to conveniently connect a commercially available infrared scanner 14 or its recorded signals to a computer system. The objective is to obtain automated digitized processing of analog detector signals to create calibrated computer generated television pictures. Module 10 easily mounts directly on the scanner case. Module 10 contains 110 VAC power supplies which eliminate batteries in the viewer. Also in this module are seven preamplifiers which amplify the raw analog signals being produced by the scanner's infrared detectors and synchronizing circuit. These signals may be sent to a data tape recorder 16, or they may be sent directly to the second electronics module 12 for immediate processing. The second module contains circuitry which receives the amplified detector signals, digitizes them, and sends them on to computer 18 for processing. In addition, the module contains circuitry which operates on the scanner's internal synchronizing signals and provides the computer with timing signals to electronically separate individual frames of data imagery. Two software programs are provided for the computer 18. One causes digitization and storage of individual frames of data, and the other contains routines which construct and manipulate a TV image on the computer 18 via the display generator 20. The output of the display generator is fed to a TV monitor 22.

2. Infrared Viewer

For the scanner 14, an infrared scanner marketed by the Hughes Aircraft Company was selected. Known as PROBEYE TM Viewer, the device is an impressively simple but effective instrument. It collects infrared radiation being emitted from an object being viewed and by electronic means, converts that radiation into a real-time visual image whose intensity is directly influenced by the intensity of infrared radiation being observed. Such an instrument supplies the input for quantitative, reactor piping, power cabling, or any other object whose performance could be optimized through a knowledge of its heat losses.

Initial marketing of the Viewer was directed at civil police and fire fighting agencies for the chief purpose of locating unconscious victims of smoke or concealed potential attackers. Operation of the viewer is based upon the principle that all animate and inanimate objects radiate infrared energy according to their surface temperatures. The viewer scans a scene, detects, and converts the radiation levels to corresponding levels of visible light and produces a display in a small viewing window. Thus, readily discernible temperature patterns are observed on the object being viewed.

Marketing experience has shown that the Viewer has achieved widespread acceptance by industrial users who are said to constitute the largest proportion of buyers. This is not surprising in view of the device's ability to detect a wide variety of problem areas. Examples are the detection of hot spots or ruptures in pipelines associated with petroleum transport, detection of structural weaknesses in mines, monitoring of the condition of electrical cables and equipment, and inspection of ductworks and chimneys for leaks.

Figure 2:
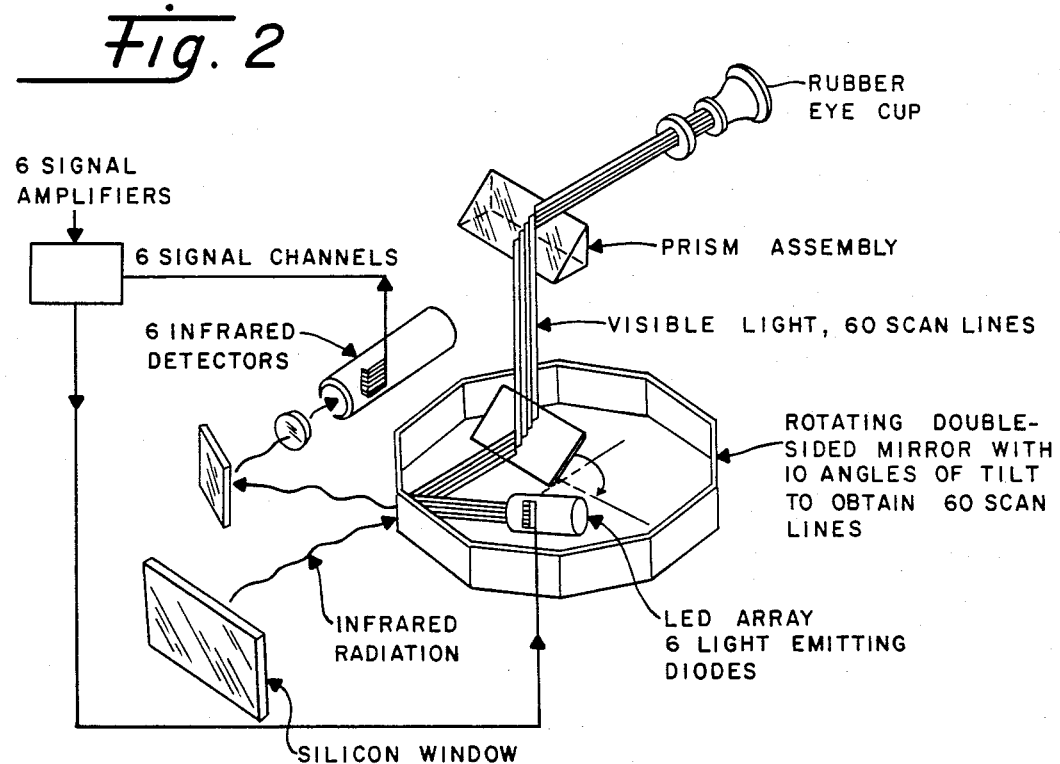
FIG. 2 is a symbolic diagram of a Viewer used as the scanner.

The viewer, shown schematically in FIG. 2, is a self-contained system packaged in a cast aluminum housing. Its chief subsystems are an optical train, a scanning mirror system, a cryostat-detector assembly, signal processing electronics, and a visual display. It uses a collimated beam scanning technique to optomechanically scan a 7.5-by-18 degree field of view. A linear array of detectors which operate at a temperature of 87° K. converts the incoming infrared energy into electrical signals. These signals are amplified and processed electronically to drive a linear array of visible-light emitting diodes or LED's which provide the visible image.

The scene being observed is scanned by the rotation of a tensided mirror whose facets are non-sequentially tilted. This generates a raster scan of geometrically non-sequential lines which as a result, does not contain distracting image flicker. Also, this technique yields a real-time display and a direct view. The visual raster is generated in direct synchronism with the infrared raster because the light from the LED's is scanned by mirror surfaces on the backside of the facets at the same time as the front surface is active.

The infrared detector array is located at the focal plane of an f/1.5 silicon-germanium doublet lens system and serves as the field stop. Thus, its linear dimensions determine the instantaneous field of view. Each detector in the array subtends 2.18 by 2.18 milliradians and all are cooled to an 87° K. operating temperature by a continuous flow of Argon gas through a Joule-Thomson Cryostat. These detectors are Indium-Antimonide material with a peak spectral response in the region of 3 to 5.4 microns.

3. Viewer Modifications

The first step in obtaining image data from the viewer 14 was to devise a method of extracting each of the six detectors' electrical outputs. A convenient method was needed which would require no disruption of the instrument's components. The connector inside the viewer's case which linked the detector array outputs to the internal electronics board was a standard Amphenol Brand multipin circuitboard plug and receptical. A similar plug receptical was obtained, modified and inserted between the resident plug and receptical. Appropriate leads were routed from the modified receptical to the outside of the instrument case via an empty battery chamber.

To function as a portable instrument, the viewer operated from power provided by two rechargeable batteries that normally reside in a pair of cylindrical compartments of the viewer's case. One battery provides 88 milliamperes at 10 volts to drive the rotating mirror motor. The other battery provides 60 milliamperes at +5 volts and -5 volts to power the internal electronics. Because it was anticipated that the instrument would be called upon to function for time intervals beyond the batteries' charge capacity, they were replaced by a power supply in module 10 which operated on standard 110 volt AC power.

The individual signals from the detectors were too small to be utilized directly, so each had to be amplified prior to sending them on for subsequent recording. The amount of amplification was determined upon the basis of the peak signals which the data recorder 16 could handle without distortion. The recorder being used was a Sangamo Corp. recorder (trademark SABRE VII) that was able to record 14 simultaneous channels. The peak signal which this machine could accept without distortion was 2.5 volts peak-to-peak. Knowing this, it was next necessary to ascertain the voltage outputs to be expected from the viewer detectors.

To obtain voltage value from the Viewer detectors, a decision had to be made as to what would be the likely range of temperatures the viewer would be required to scan. It was concluded, somewhat arbitrarily, that possible objects for study should range from the walls of residential structures to industrial boilers. The next logical step was to obtain infrared calibration sources which comfortably bracketed the expected temperatures of these structures. The sources selected because of their ready availability were a block of dry ice whose temperature was $-78°$ C. and a hot black body calibrator set at a controlled temperature of 100° C. When these sources were positioned to fill the field of view, the output voltages from the detectors were found to be $-1$ millivolts for the cold source and $-8$ millivolts for the hot source. The maximum $\Delta v$ was 7 millivolts. The preamps were therefore designed to provide a gain of 140 to bring the signals within the tape recorder's optimum range which was taken to be only $+1$ volt for conservatism (2.0 volts peak-to-peak).

To digitize the signals from each detector and store them in a sequence that would permit image reconstruction, a method had to be devised to designate the start of a frame of data. This was accomplished by the simple step of narrowing one sync mirror surface with a piece of opaque tape. The sync mirror surfaces are ten small reflective zones, one per mirror facet on the inside surfaces of the rotating mirror drum, which produce ten timing pulses per frame. These pulses provide the viewer internal electronics with a time reference to "blank" or turn off each scan line as a mirror facet reaches its optimum scene scan. Also, the blanking pulse causes the next scan line associated with the next sequential mirror facet to remain turned off until that facet has rotated to its optimum position coincident with start of scene scan. The net function of the blanking pulse is to prevent the mirrors from generating spurious image data from the inside of the viewer case and projecting it on the right and left sides of the LED image seen by the observer. A side effect of narrowing a sync mirror with tape was to noticeably shorten one scan line of each of the six detectors. This caused the right and left end regions of the image to exhibit a 15% shortened scan line in the ratio of one out of every ten lines.

Electronically, the sync pulses, when viewed on an oscilloscope, displayed a square wave pattern. The pulse width of the pulse coming from the narrow mirror was significantly narrower, providing just the kind of discriminator needed to signal the end of one data frame and the start of the next frame. To protect the viewer circuitry and prevent pulse distortion, a preamplifier circuit of similar design to the detector preamps was utilized. In this case, however, the amplification gain was unity thereby causing it to serve as a buffer to external influences.

Finally, the detector signals and sync signal were carried via coaxial connectors and coaxial cables from the Viewer electronics chassis to the recorder.

4. Data Digitizer Design and Fabrication

Figure 3:
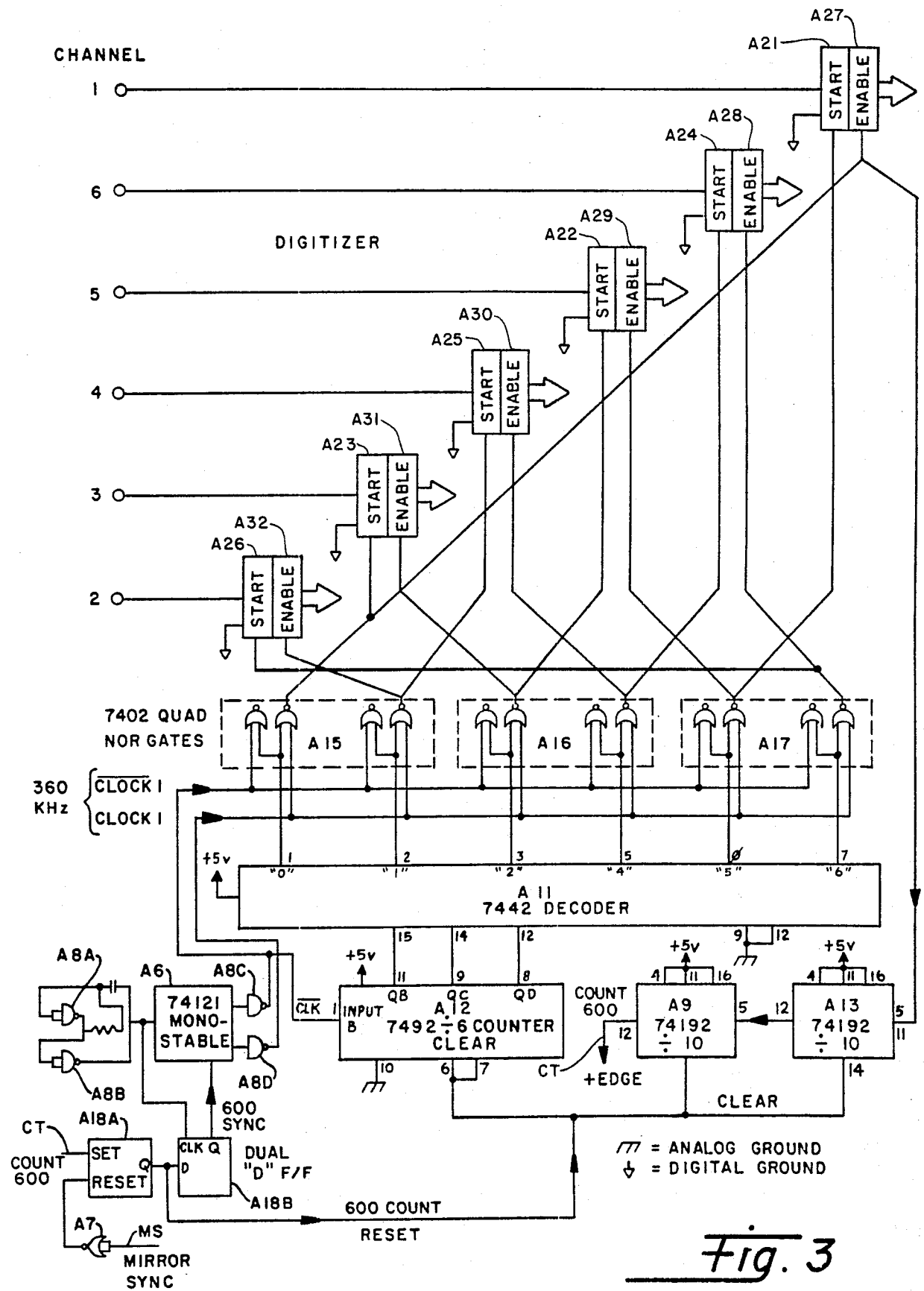
FIG. 3 is a functional block diagram of the digitizer circuits.

After the Viewer has been used in the field to observe scenes of interest and its detector outputs have been recorded on analog tape, the next phase of operation is to transfer the data to a digital computer. The transfer requires the analog detector data, which consists of six channels of irregularly varying voltage levels to be converted into as many channels of discrete sequential voltage steps, i.e., the analog signals must be digitized. The digitizer 12 is shown in FIG. 3.

Operation of the digitizer requires that each channel of analog data be connected to individual A/D converters. At the same time, the Viewer's sync signal is fed into appropriate electronics which provide A/D output control. The purpose of this control function is to supply automatic end-of-previous-frame/start-of-new-frame signals which will serve as flags for the computer to utilize for proper data storage sequencing. The result is a digital data stream from each A/D device in the form of eight outputs ganged through six 8-bit input-/output port devices to the computer. More detailed discussion of these electronic stratagems will now be presented.

The heart of the digitizer is the A/D (analog to digital) conversion device of which six were used (one for each data channel). A suitable A/D device is manufactured by Hybrid Systems of Bedford, Mass. It features a 2.5 $\mu$ sec conversion time, 650 mW of power consumption, and 8-bit resolution. Identified as an ADC 542, the device is a hybrid, 24 pin, metal encased circuit module which has its own internal clock thereby minimizing the need for external circuit elements.

Before the digitizer could be designed and built, a decision had to be made as to how many picture elements or "pixels" would be necessary to reconstruct an image frame. Also, the number of pixels per frame and therefore the total number of data bits flowing from the digitizer to the computer could not be allowed to exceed the input rate which the computer would accept. An additional consideration was the speed of analog-to-digital conversion achievable by the A/D converters. After considering these criteria and remembering that the visual image seen through the Viewer is 60 scan lines high, it was decided that a horizontal sampling rate of 100 points would be an optimum choice. Thus a single frame of imagery would be divided into a grid pattern of 6000 data samples, i.e., 6000 pixels.

To obtain a meaningful digital data stream out of the digitizer, the output of each of the six A/D converters A24 to A26 must be turned on and off in a precise manner. This is necessary to insure that the computer will receive data bits representing the 6000 pixels in the proper sequence thereby permitting their storage in a logically retrievable order. These A/D's are in reality free running devices which means they are constantly digitizing any signals being received by them. Their outputs are therefore enabled/disenabled by routing those outputs through buffer devices A28 to A32, each of which is an 8212 8-bit Input/Output Port which acts as a gated buffer. Each device consists of an 8-bit latch with triggerable buffers to transmit data. Data buffering of the A/D device is accomplished by grounding the mode pin of the 8212, holding its Strobe input high, and enabling data output by applying a control signal into the DS2 pin. When the DS2 input signal goes high, the data being received from the A/D device is directly transferred to the 8212 output pins. When the DS2 input signal goes low, the 8212 buffer is disabled and the data flow halts. To minimize output wiring, corresponding output pins of the six 8212 devices are bussed together, i.e., least-significant-bit output pins are bussed to one output line, next-most-significant-bit pins are bussed to a different output line, etc., up to and including the most-significant-bit pins. FIG. 3 gives a schematic diagram of the overall digitizer functional layout to which the reader should refer as an aid for the above discussion and for the discussion of the control logic which follows.

Figure 4:
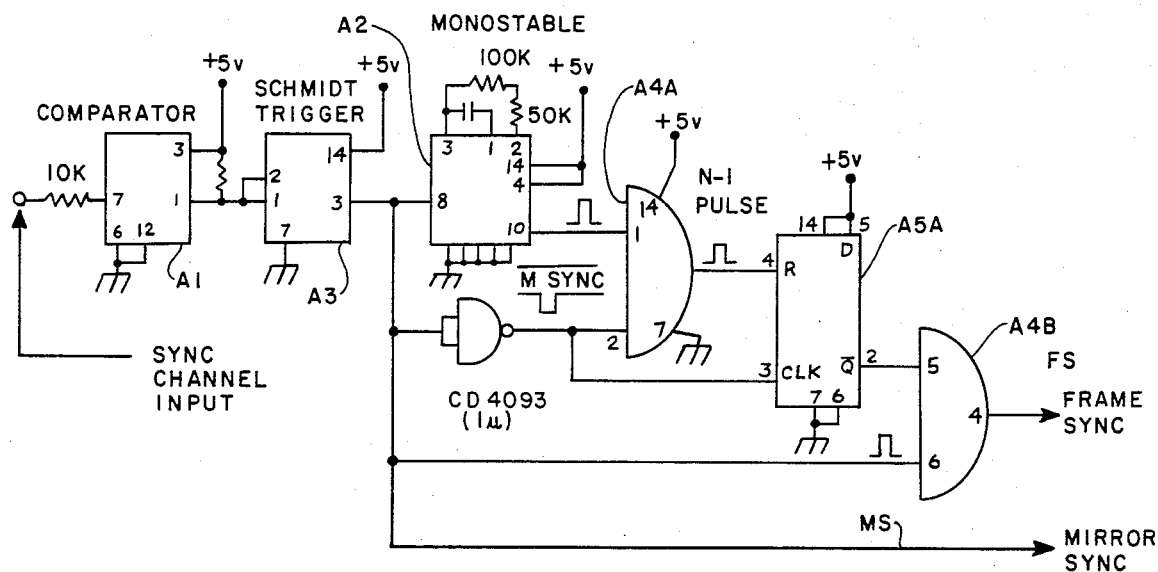
FIG. 4 is a functional block diagram of the mirror/frame synchronizing circuit of the digitizer.
Figure 5:
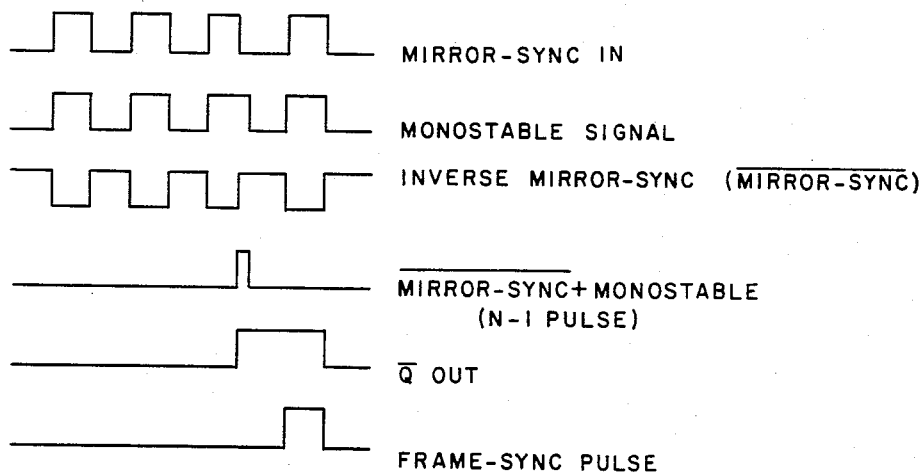
FIG. 5 is a mirror/frame sync logic timing diagram.

Sampling of digitized data requires that a mirror-sync signal be available as a stable reference and that a second signal be generated which clearly differentiates when one frame of data has ended and the next frame begins. To obtain the first of these two signals, as shown in FIG. 4, the raw mirror-sync signal coming out of the Viewer is made relatively noise free by sending it through one unit of an MC3302 Quad Comparator A1 and one unit of a CD4093 Schmidt Trigger A3. The resultant sharp square wave signal is routed to four locations for later simultaneous use, one of which is a CD4047 Monostable Multivibrator A2. This device operates as a pulse generator which is triggered by the mirror-sync pulse train each time a positive going pulse edge is received. Recall that the mirror-sync signal has one narrow pulse out of each ten. By appropriate selection of external timing resistor and capacitor values, the output of monostable A2 yields pulse widths equal to the unmodified mirror-sync pulse widths. A CD4081 AND Gate A4A sums the monostable vibrator output and inverted mirror-sync signal (designated henceforth as "$\overline{\text{m-sync}}$") from a CD4093 inverter) with the result being an output consisting of a single narrow pulse. This pulse is the difference between the narrowed mirror pulse and a full width pulse. The difference pulse in conjunction with the $\overline{\text{m-sync}}$ signal operates a "D" flip-flop A5 causing it to output one wide gate pulse for each ten mirror-sync pulses. The "D" flip-flop output plus the mirror-sync signal drives a CD4081 AND Gate A4B to give a full width single pulse which becomes the frame-sync flag. FIG. 5 shows a logic diagram which illustrates how the frame-sync pulse is obtained.

As has been stated earlier, the Input/Output Ports of buffer devices A27 to A28 in FIG. 3 must be enabled for a time period equal to one frame of mirror scan time and their outputs must be enabled in a specific sequence. The reference for this time period is obtained from the output of a 360 KHz oscillator constructed by interconnecting two units of two 2-Input 7400 NAND Gate A8A and A8B. This 360 KHz signal is routed to one member of a Dual "D" Flip-Flop A18B type 7474 and to a 74121 Monostable Multivibrator A6. This multivibrator device is used as a pulse generator whose input (the 360 KHz oscillator signal) is triggered by a control signal obtained from "D" flip-flop A18B. The control signal is derived by applying the mirror-sync on lead MS and 600th count signals on lead CT discussed later, to a "D" flip-flop A18A whose function is the synchronization of the 600th count pulse to the mirror-sync signal. The 600th count pulse will therefore be synchronized with the end of the precise time period needed for ten mirror facets to scan a scene, i.e., in the time needed for precisely one frame to be produced. When a 600th count pulse arrives at the flip-flop, the mirror-sync signal is gated off momentarily to provide a clear pause between two data frames. The two outputs of this flip-flop are sent through a second "D" flip-flop A18B to slightly delay them and to achieve an output signal synchronized to the 360 KHz oscillator signal. That output is the control signal mentioned at the first of this paragraph which triggers the 74121 multivibrator. The "Q" output of the first flip-flop A18A is also routed to counting circuitry (which will be described next) in the form of a 600th count reset pulse. The output of the monostable device A6 is a clock signal with a pulse width of 0.7 μs which is necessary to establish proper sequencing of the individual 8212 Input/Output Ports. First though, the clock outputs of monostable A6 are passed through two units A8C and A8D of a 7400 Quad 2-Input NAND Gate to receive current amplification for driving downstream 8212 triggering devices.

The 600th count pulse is obtained after a series of operations have been performed on the inverse clock output of the monostable multivibrator A6 (henceforth designated by "$\overline{clk}$"). This $\overline{clk}$ signal is sent to a 7492 Binary Divide-by-6 Counter A12 whose output is routed to a 7442 BCD-to-Decimal Decoder A11. The decoder sequentially passes a pulse on each of six output lines. Those outputs together with the *non*inverted clock signal from the monostable device A6 sequentially activate each of six NOR Gates of 7402 Quad devices A15, A16, A17. Each NOR Gate passes a signal which in turn triggers a specific 8212 Input/Output Port and thereby causes a data dump of its A/D convertor. In addition, the trigger signal to the Channel No. 1 A/D convertor-8212 duo is sent to a pair of 74192 Divide-by-10 Counters A9 and A13 which are series connected. Here the trigger signal (now 60 KHz) is divided by 100 thereby passing one pulse in every 600. Thus that one pulse out of every 600 pulses becomes the 600th count flag on lead CT which goes to the "D" flip-flops discussed in the previous paragraph.

5. Data Recording in the Field

Use of the viewer 14 and the recording of its analog data output in the field required several support equipment items. A standard rollaway 19-inch equipment rack was loaded with a 14-channel Analog tape recorder SABRE VII, a time-code reference generator, a dual-channel oscilloscope, and a regulated power supply. The 19-inch rack was a five foot tall variety chosen for its relative ease of movement. The purpose of the time-code generator was to provide a time reference signal to be recorded on one of the recorder's unused data channels. This time signal permitted a subsequent data frame to be referenced against the WWV International Time Standard, being transmitted from Boulder, Colo., as a documentation aid. The oscilloscope was used to monitor the status of any two input lines to the recorder dependent upon which of those lines the operator chose to connect to the scope for inspection. The rollaway rack provided necessary mobility for positioning the support equipment near a heat source or structure to be scanned. However, the loaded rack was heavy and would have required at least a pickup truck if repositioning beyond the immediate building had been contemplated. In addition, all equipments required 110-volt power so any intended investigation site required an outlet close at hand or else an appropriate extension cord was a must support item.

Acquisition of raw data was straightforward. The seven outputs of the viewer 14 were connected to alternate inputs of the recorder's 14 input channels and the time-code signal was connected to any one of the remaining unused channels. Alternate channels were used for data as a conservative and probably unnecessary precaution against encountering signal crosstalk between adjacent channels on the tape. The Viewer was turned on, the cryostat gas was allowed to achieve detector cooldown and the scanning process was begun. The structure of interest was scanned vertically or horizontally in concert with its natural dimensions and at a slow rate of translation. The imagery obtained was recorded at a tape speed of 120 inches per second (ips) as opposed to 30 or 60 ips, to achieve maximum fidelity of recorded signal. During the scan process, signal status was regularly monitored by observing the mirror-sync waveform and a detector output waveform on the oscilloscope. Upon completion of data recording, the equipment rack was returned to the laboratory and prepared for data transfer to the computer.

To provide backup documentation of the structures being investigated, several instant photographs were taken of the structure from the exact position where the operator stood while recording infrared imagery. In addition, surface temperatures of the infrared source were obtained by placing a sensitive thermistor on the surface and recording the resultant resistance. This resistance value was later compared with the manufacturer's calibration table to obtain a temperature.

6. Computer Data Processing

The transferral of digitized data into computer storage requires two actions. First, the same channels into which data and mirror-sync signals are routed must be output to the digitizer and second, the digitizer 12 must be connected to the computer 18. Connection of the recorder 16 to the digitizer 12 is straightforward requiring only that 7 BNC cables be connected between corresponding channels of recorder output and digitizer input, i.e., mirror-sync to mirror-sync, channel no. 1 to channel no. 1, etc. Connection of the computer 18 to the digitizer 12 is simplified by use of a standard power module (Tektronix TM-500) and blank plug-in chassis. The digitized data output signals are fed to the proper printed circuit board connectors which route them along specific data lines which the computer recognizes due to the manufacturer's design. Proper interaction of computer and digitizer requires some special attention however, and the means for providing that attention will be described next.

Figure 6:
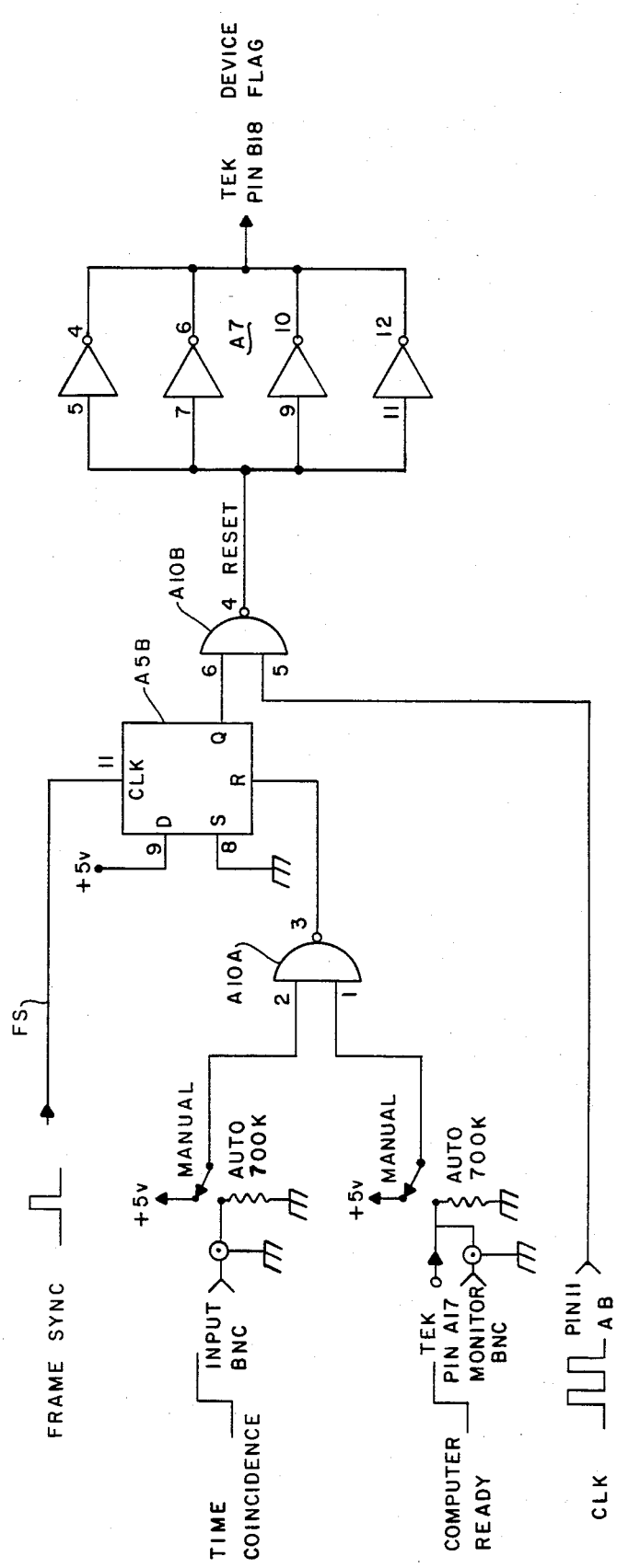
FIG. 6 is a functional block diagram of a computer/digitizer "handshake" circuit.

The digitizer must be made to pass data to the computer only when the computer is ready to receive or else an overflow condition will occur. Also, the data interruption needed by the computer must occur at the end of transfer of one complete frame of data. The electrical diagram in FIG. 6 illustrates the electronic circuit that provides these controls. Two signals are required, one of which is a "computer ready" signal from the computer while the other is the frame-sync pulse. The frame-sync pulse performs a dual function of clocking a "D" flip-flop A5B and serving as a flag signal marking the separation of data frames. This frame marker signal called coincidence signal and the computer ready signal are sent to a CD4011 CMOS Quad 2-Input NAND Gate A10A. When these two positive pulses arrive at the NAND Gate A10A within a time span equal to either of their pulse widths (i.e., when they coincide) a signal is sent out by the gate A10A to the above mentioned "D" flip-flop A5B as a "reset"

signal. The flip-flop is being clocked by the frame-sync waveform thereby causing a pulse to be sent out only when the computer is in its ready condition simultaneous with the instant that a frame separation pulse arrives at the flip-flop. The signal from flip-flop A5B is then NANDed at gate A10B with the mirror-sync waveform, called clk in FIG. 6, to generate a null signal *only* when a mirror-sync pulse and a frame-sync pulse arrive simultaneously at the gate A10A, i.e., when ten mirror facets have swept the scene and the frame is complete. The computer recognizes the null signal as the digitizer telling that 6000 pixels have just been transmitted to complete the frame. It therefore stops accepting and awaits the next acceptance order which results from activation of the digitization driver program by a console operator.

The computer being used in this project was a mini-computer (HEWLETT-PACKARD MODEL 2100MX) which required the use of a Hewlett-Packard version of FORTRAN. The program "DATAN" used to activate the data flow from the digitizer and store it for later processing is listed below. The program is activated by entering the command "Run DATAN." The computer thereupon creates a storage array to receive 6000 pixels of data and additional arrays to accept a file identifier and to relocate needed resident subroutines. After the arrays have been established, 6000 pixels values are accepted and the console operator is requested by the machine to specify a name by which the new data file shall be identified. If the data flow is disturbed by some malfunction such as a damaged section of tape, a warning is displayed telling of problems encountered in creation of the file and the program aborts. If on the other hand, no data errors occur but the operator enters a file name that violates the prescribed format, a warning will be displayed advising that a write error has been committed and the program aborts.

7. Computer Imaging Software

Television imagery is created from the Viewer infrared data by the computer 18 and a Display Generator 20 (GRINELL SYSTEMS CORP. GMR-27) which is controlled by the computer 18. The image is constructed by a program "PROB3" which sequentially recalls 6000 pixels of data and assembles a picture after pixel intensity normalization routines have been performed. On the right side of the image a ten-step grey scale is projected which divides the difference between the darkest (coldest) and brightest (hottest) regions of the scene into ten levels of intensity. The program "PROB3" that was written to generate data imagery and a description of the program's functional content is listed below and described in the following paragraphs.

Image pixel assembly is accomplished by creating a system which subdivides a picture into 60 scan lines, ordered in groups of ten lines per detector. These groups of ten lines form individual bands and each line can be further subdivided according to the mirror facet which sweeps it out, the detector which generates it, and column blocks or pixel units that subdivide each line in the horizontal direction. Appropriate octal coded instructions are issued to the GMR-27 which cause the pixel locations to be loaded with the pixel voltage values and turned on in a specific order. Thus, the starting address representing the first or No. 1 pixel to be turned on is located in the extreme bottom left corner in accordance with GMR convention. The display routine proceeds vertically up the column turning on one pixel per line until that column is completed by the turning on of the 60th pixel. The display routine next instructs the GMR-27 to step to the right one column and down to the bottom line whereupon pixels are again turned on in vertical ascension. This stepping process is repeated automatically 100 times horizontally across the image field to yield a total picture measuring 60 scan lines in height by 100 pixel columns in width.

The first requirement to be satisfied with the program is that of reserving memory storage space for pixel data, address arrays, and frame identification arrays. The names of these arrays and the information they store are "IR" for the digitizer's serial output voltage values, "JD" for mirror facet identification, "JE" for scan line addressing, "JF" for detector numbering, "ID" for column addressing, "IB" for pixel values by detector, "IC" for pixel addressing, "NAME" for frame identification, and "IDCB" for computer required subroutines. Program statements 0008 through 0028 create a working file for and retrieve a set of 6000 digitizer voltage values permanently stored under the file name entered on the console by the operator in response to statement 0020. If the operator wishes to have a printout of information about the manipulations he will perform upon the data, he responds "Yes" to statement 0016. An example of the autologging printout is shown in Table A. When the file name is entered in response to statement 0020, any errors of name format, nonexistence of the named file, or errors in the data field format will cause an immediate program abort. If no errors occur, the data values are retrieved, the file is closed, and data processing by operator command can proceed.

TABLE A

FILE NAME: PW0102
SCENE AVERAGED BETWEEN COLUMNS: 90 & 100
IOFF= −27
IOFF= −27
IOFF= 12
IOFF= 19
IOFF= 2
IOFF= −33
DETECTOR VOLTAGE LIMITS OF SCENE= 124 (MAX), 150 (MIN).

The first step in data processing requires the operator to choose right and left-hand pixel columns between which he wishes pixel values to be averaged. The choice of columns is arbitrary for the initial display of an image. Columns 95 and 100 are usually selected since little scene structure occurs so near the edge of a frame. Once the first image display has been generated, a visual inspection of the image can determine a more appropriate area to average. The purpose of the averaging process is to enable the operator to select that region of the displayed scene which contains background radiance having minimal intensity variations. When the right and left column numbers are entered into the computer, detector voltage values for all pixels scanned by each detector between those columns are summed and divided by the number of values summed. This gives an average background value seen by the six individual detectors. The median intensity that can be displayed by the GMR-27 is grey which corresponds to the binary value of 128, whereas a white display corresponds to a value of zero, and a black display corresponds to a value of 255. Therefore, 128 is subtracted from each averaged background detector value to give an offset value which is called IOFF. These offset values are listed on the log printout and are subtracted from the pixel values of the 1000 pixels which lie within individual detector bands. This normalizes all 6000 values to a common background level. Also, the values of maximum and minimum brightness are forced to fall between the GMR-27 generator's maximum and minimum display range capability. The selection and averaging process is contained in program statements 0031 through 0052.

The actual display process requires some manipulation of scan lines. As was stated in Section 1, the ten facets of the mirror drum are tilted in a nonsequential order for the purpose of preventing image ripple or flutter. This facet arrangement therefore causes the particular scan line associated with that facet to be traced out within each detector band simultaneously. Analysis of the image signals from the Viewer with an oscilloscope revealed that detector band reconstruction starts at the bottom and proceeds toward the top of the bands with the scan lines being assembled in the order of Nos. 6, 1, 0, 5, 8, 9, 3, 4, and 2. Program statements 0053 through 0062 cause these lines to be assembled into a correctly sequenced image. In addition, it is necessary that the order of detector bands be specified so statements 0073 through 0078 accomplish that.

Additional manipulation of scan lines is required to give the correct vertical alignment, because of small variations in the time intervals between completion of one facet's scan and start of the next facet's scan. To correct this, each scan line is shifted a specific number of pixels toward the left. Program statements 0062 through 0072 provide the necessary shifts by specifying pixel addresses where the lines should begin.

Program statements 0079 through 0084 cause all 6000 pixel brightness values to be surveyed and the maximum and minimum values to be identified. Statements 0085 through 0087 cause those maximum and minimum values to be displayed at the operator's console and asks the operator to enter any different values he might prefer. Entry of different limits will cause the image to be displayed with all values between these limits being displayed on an expanded or reduced scale as is mathematically appropriate. The image will therefore have an altered dynamic range of intensity enabling the operator to enhance weak detail within the image. If autologging is in effect, the new maximum and minimum values entered by the operator are listed according to statements 0088 through 0090. Statements 0089 through 0096 cause the pixel values to be raised or lowered as required to keep them within the GMR-27 generator's dynamic range capability and statements 0097 through 0165 are display instructions required by the GMR-27 to remove the uneven ends of the raw image, insert a frame outline, and create the grey scale.

Statements 0166 and 0167 cause the program pointer to return to the starting point of the program where the operator is requested to enter a new file name. Thus, an operator may analyze as many files in as many variations of dynamic range as he may choose and he may do so in a continuous manner.

8. Data Analysis

Use of the Viewer as a remote sensing diagnostic tool for energy analysis of a variety of heat emitters offers great promise. The system of FIG. 1 has been used to provide sample imagery of a natural gas fired power station, a network of steam heat pipes in an office building, and a light pickup truck. These data samples illustrate the versatility of the Viewer for surveying heat losses. (See Section 8 of said Walker report).

9. Calibration Considerations

Data imagery displays whose ten-step grey scales are calibrated in terms of energy engineering units are necessary if the Viewer is to be a useful diagnostic tool. Calibration in units of temperature or in units of radiance appear to be two possibilities. If radiance is utilized, it is possible to obtain black body equivalent target surface temperatures from radiance values by applying the Planck radiation function.

Materials having an emissivity independent of wavelength are called "gray bodies" and materials having wavelength dependent emissivities are called "spectral" or "colored bodies".

Several methods can be used to obtain thermodynamic temperatures by radiometric means. They include measurements of total radiation, radiation at a particular wavelength, wavelength distribution, and apparent color radiation. The simplest and most frequently used approach is to evaluate emissive radiance $N_e$ from an opaque solid as though it were a gray body.

It should be possible to measure calibration sources of known temperature and evaluate resultant images in units of spectral radiance (watts/cm$^2$ sterad-micron) which quantifies energy coming from the source. Measurement of a calibration source before going into the field, at frequent intervals while in the field, and after returning from the field allows an analyst to construct a record of the Viewer's response during field use and in the laboratory. With this information he can assign radiance values to the steps of the grey scale for data images and be confident of their validity because he will always have calibration references which were obtained at times close to when the data images were recorded.

An alternate approach would be to construct a calibration source consisting of at least three panels which could be held at separate temperatures. The temperatures chosen should fall at the low, middle, and high ranges of the grey scale. Each time a data target is measured, the calibration target should be recorded (preferably before *and* after the target data measurement). By following this field procedure, the analyst could create data image displays whose grey scale would be calibrated in temperature. The analyst could then evaluate the temperatures of target surfaces and calculate heat flows from those surfaces.

10. Summary

A system, for remotely analyzing heat losses heat from structures, piping systems, power stations, etc., which produces diagnostic infrared imagery has been successfully designed, constructed and demonstrated. This system uses off-the-shelf components which represent state-of-the-art capability for purchasers having moderate financial backing. This system does not require operators to possess highly specialized expertise for its use or maintenance. A computer having moderately extensive graphics display capability is necessary and an analog data tape recorder having at least seven channels of good fidelity recording capability should be employed for raw data storage in the field.

| PROGRAM 1 |
| --- |
| FIN,L |

-continued

PROGRAM 1

```
           PROGRAM DATAN
           DIMENSION IR(6000), NAME(3), IDCB(144)
           CALL RMPAR(IR)
           ILU=1
           IF (IR(1).NE.0)ILU=IR(1)
           WRITE (ILU,100)
100        FORMAT ("ENTER FILE NAME=_")
           READ (ILU,101) NAME
101        FORMAT (3A2)
           IF (CREAT (IDCB, IERR,NAME,47,1))901,1
1          CALL EXEC (1,11,IR,6000)
           IF (WRITE(IDCB,IERR,IR,6000))902,2
2          CALL CLOSE (IDCB)
           STOP
901        WRITE (ILU,911)IERR,NAME
911        FORMAT ("ERROR IN CREAT=",17,"FILE=" 3A2)
           STOP
902        WRITE (ILU,912)IERR,NAME
912        FORMAT ("ERROR IN WRITE=",17,"FILE=" 3A2)
           STOP
           END
           END$
```

PROGRAM 2

```
0001  FTN,L
0002  C        AUTHOR: CAPT. R. P. WALKER
0003           PROGRAM PROB3(3,90)
0004           DIMENSION IR(6000),IA(20),JD(10),
                 IDCB(144),NAME(3)
0005           DIMENSION JE(10),JF(6),ID(100)
0006           DIMENSION IB(6,1000),IC(6,100,10)
0007           EQUIVALENCE (IR(1),IB(1,1),IC(1,1,1))
0008           CALL RMPAR(IR)
0009           ILU=1
0010           NLU=20
0011           IGR=255
0012           IF(IR(1).NE.0)ILU=IR(1)
0013           IF(IR(2).NE.0)NLU=IR(2)
0014           IF(NLU.EQ.7)IGR=15
0015           WRITE (ILU,6000)
0016  6000     FORMAT ("DO YOU WANT AUTO-
                 LOGGING?_")
0017           READ (ILU,6100) LOG
0018  6100     FORMAT (A2)
0019  1000     WRITE(ILU,100)
0020  100      FORMAT("ENTER FILE NAME=_")
0021           READ(ILU,101)NAME
0022  101      FORMAT (3A2)
0023           IF (NAME (1) .EQ. 2HST) GO TO 999
0024           IF (LOG .EQ. 2HYE) WRITE (6,6101) NAME
0025  6101     FORMAT ("FILE NAME: ",3A2)
0026           IF(OPEN(IDCB,IERR,NAME))901,1
0027  1        IF(READF(IDCB,IERR,IR,6000))902,2
0028  2        CALL CLOSE(IDCB)
0029           DO 200 I=1,6000
0030  200      CALL SHFT(IR(I))
0031           WRITE (ILU,401)
0032  401      FORMAT ("ENTER COL. NO'S TO
                 AVERAGE BETWEEN:_")
0033           READ (ILU,*) N1,N2
0034           IF (LOG .EQ. 2HYE) WRITE (6,6001) N1,N2
0035  6001     FORMAT ("SCENE AVERAGED BETWEEN
                 COLUMNS: ",I3," & ",I3)
0036           DO 300 I=1,6
0037           SUM=0
0038           N=0
0039           DO 301 J=N1,N2
0040           DO 302 K=1,10
0041           N=N+1
0042  302      SUM=SUM+IC(I,J,K)
0043  301      CONTINUE
0044           IAVG=SUM/N
0045           IOFF=IAVG-128
0046           WRITE(ILU,402)IOFF
0047           IF (LOG .EQ. 2HYE) WRITE (6,402) IOFF
0048  402      FORMAT("IOFF=",I6)
0049           DO 303 J=1,100
0050           DO 303 K=1,10
0051  303      IC(I,J,K)=(IC(I,J,K)-IOFF)
0052  300      CONTINUE
0053           JD(1)=6
0054           JD(2)=1
0055           JD(3)=0
0056           JD(4)=5
0057           JD(5)=8
0058           JD(6)=9
0059           JD(7)=3
0060           JD(8)=4
0061           JD(9)=7
0062           JD(10)=2
0063           JE(1)=87
0064           JE(2)=86
0065           JE(3)=87
0666           JE(4)=87
0067           JE(5)=86
0068           JE(6)=87
0069           JE(7)=87
0070           JE(8)=85
0071           JE(9)=87
0072           JE(10)=87
0073           JF(1)=5
0074           JF(2)=4
0075           JF(3)=3
0076           JF(4)=2
0077           JF(5)=1
0078           JF(6)=6
0079           MAX=0
0080           MIN=256
0081           DO 500 I=1,6000
0082           IF(MAX.LT.IR(I))MAX=IR(I)
0083           IF(MIN.GT.IR(I))MIN=IR(I)
0084  500      CONTINUE
0085           WRITE (ILU,510) MIN,MAX
0086           READ (ILU,*) MIN,MAX
0087  510      FORMAT("MIN, MAX= ",217,/,"ENTER MIN,
                 MAX= _")
0088           IF (LOG .EQ. 2HYE) WRITE (6,6010) MIN,
                 MAX
0089  6010     FORMAT ("DETECTOR VOLTAGE LIMITS
                 OF SCENE=",I7,"(MAX),",
0090             I17," (MIN).")
0091           A=FLOAT(IGR)/FLOAT(MAX-MIN)
0092           DO 501 I=1,6000
0093           IR(I)=(IR(I)-MIN)*A
0094           IF (IR(I).LT.0) IR(I)=0
0095           IF (IR(I).GT.IGR) IR(I)=IGT
0096  501      CONTINUE
0097           ID(1)=100001B
0098           ID(2)=010377B
0099           ID(3)=024001B
0100           ID(4)=026017B
0101           ID(5)=030000B
0102           ID(6)=044305B
0103           ID(7)=050013B
0104           ID(8)=054000B
0105           ID(9)=064104B
0106           ID(10)-070005B
0107           ID(11)=074006B
0108           ID(12)=124000B
0109           AK=0.
0110           DO 400 KK=1,10
0111           K1-AK+0.5
0112           ID(2*KK+11)=010000B+(K1)
0113           AK=AK+255./9.
0114           ID(2*KK+12)=036000B
0115  400      CONTINUE
0116           CALL EXEC(2,20,ID,32)
0117           ID(1)=026012B
0118           CALL EXEC(2,20,ID,1)
0119           ID(1)=010155B
0120           ID(2)=064103B
0121           ID(3)=044126B
0122           ID(4)=050000B
0123           ID(5)=072075B
0124           ID(6)=050146B
0125           ID(7)=072000B
0126           ID(8)=044126B
0127           ID(9)=064103B
```

-continued
PROGRAM 2

| | | |
|---|---|---|
| 0128 | | ID(10)=050146B |
| 0129 | | ID(11)=072000B |
| 0130 | | ID(12)=050000B |
| 0131 | | ID(13)=072075B |
| 0132 | | ID(14)=044304B |
| 0133 | | ID(15)=064103B |
| 0134 | | ID(16)=050000B |
| 0135 | | ID(17)=072075B |
| 0136 | | ID(18)=050015B |
| 0137 | | ID(19)=072000B |
| 0138 | | ID(20)=064103B |
| 0139 | | ID(21)=044304B |
| 0140 | | ID(22)=050015B |
| 0141 | | ID(23)=072000B |
| 0142 | | ID(24)=050000B |
| 0143 | | ID(25)=072075B |
| 0144 | | CALL EXEC(2,20,ID,25) |
| 0145 | | IA(1)=044000B+JE(1) |
| 0146 | | IA(2)=064104B |
| 0147 | | IA(3)=050000B |
| 0148 | | IA(4)=070012B |
| 0149 | | IA(5)=026012B |
| 0150 | | IA(6)=054001B |
| 0151 | | IA(7)=074304B |
| 0152 | | IA(8)=100001B |
| 0153 | | IA(9)=010377B |
| 0154 | | IA(10)=024001B |
| 0155 | | IA(11)=124000B |
| 0156 | | CALL EXEC(2,20,IA,11) |
| 0157 | | IA(7)=034017B |
| 0158 | | DO 203 JJ=1,10 |
| 0159 | | J=JD(JJ)*600 |
| 0160 | | DO 202 K=0,599,6 |
| 0161 | | DO 201 I=1,6 |
| 0162 | 201 | IA(I)=IR(J+K+JF(I)) |
| 0163 | 202 | CALL EXEC(2,20,IA,7) |
| 0164 | | IA(1)=044000B+JE(JJ+1) |
| 0165 | | IA(2)=060001B |
| 0166 | 203 | CALL EXEC(2,20,IA,2) |
| 0167 | | GO TO 1000 |
| 0168 | 901 | WRITE(ILU,911)IERR,NAME |

Thus, while preferred constructional features of the invention are embodied in the structure illustrated herein, it is to be understood that changes and variations may be made by the skilled in the art without departing from the spirit and scope of our invention.

We claim:

1. An infrared imaging system comprising:
   an infrared scanner which receives infrared radiation from a scene and produces analog signals for a plurality of individual pixels in frames with a scanning raster, including sync signals;
   a digitizer which receives said analog signals and sync signals and produces corresponding digital signals, providing a digital value for each pixel which is a function of the infrared intensity from said object;
   processing means including memory means and a display generator for storing and processing a frame of the digital signals to create a display frame; and
   means for displaying said display frame as an image of said scene;
   wherein said processing means includes means to cause all pixel brightness values to be surveyed and the maximum and minimum values to be identified, means to cause said maximum and minimum values to be displayed at an operator's console and to permit entry of different values, and means to create a grey scale as part of the display frame;
   whereby the system is capable of generating calibrated quantitative imagery which may be utilized as a diagnostic tool for the analysis of heat flow from surfaces.

2. An imaging system according to claim 1, wherein said processing means further includes autologging means for listing new maximum and minimum values entered by an operator, means to cause pixel values to be raised or lowered as required to keep them within the display generator's dynamic range capability, and means to return to a program starting point and permit the operator to enter a new file name, so that the operator may analyze as many files in as many variations he may choose and do so in a continuous manner.

3. An imaging system according to claim 1, wherein said infrared scanner includes a linear array of N detectors to convert the incoming infrared energy into said analog signals, a scanning mirror system comprising M mirrors in a ring forming a drum which is rotated during operation, the infrared radiation being reflected from the mirrors to said detectors, each mirror having a different angle of tilt to obtain N×M scan lines in an infrared raster, sync mirror surfaces comprising M small reflective zones, one per mirror facet on the inner surfaces of said drum, to produce M timing pulses per frame, one sync mirror surface being narrowed to designate the start of a frame of data.

4. An imaging system according to claim 3, wherein said infrared scanner is part of a viewer in which the mirrors have inner and outer reflecting surfaces, the infrared radiation being reflected from the outer surfaces, an array of N light emitting diodes inside the drum, amplifying means coupled between said detectors and said light emitting diodes to provide a visual image from the diodes, light from the diodes being reflected from the inner reflecting surfaces at the same time as the outer reflecting surface is actively reflecting the infrared radiation, to create a visual raster in direct synchronism with the infrared raster.

5. An imaging system according to claim 3, wherein said digitizer comprises N A/D conversion devices, a mirror/frame-sync circuit, and timing means;
   the analog signals produced by the N detectors being coupled respectively to the N A/D conversion devices, the A/D conversion devices having digital outputs coupled via gating means to a digital bus;
   the sync signals produced by the scanning means being coupled to the mirror/frame-sync circuit, which includes means to provide mirror-sync pulses M times per frame, and a frame-sync pulse once per frame;
   said timing means comprising a pulse generator producing clock signals at a given frequency, first counting means having an input coupled to the pulse generator to advance the count once for each clock pulse from 1 to N and then recycle, with outputs from the first counting means coupled to said gating means to sequentially pass digital outputs from the A/D conversion devices to the digital bus, second counting means for counting from 1 to K having an input from one of the outputs of the first counting means so that the second counting means is advanced once per cycle of the first counting means, means coupled between an output of the second counting means and inputs of the pulse generator and of the first and second counting means to synchronize and reset them to an initial condition in response to the second counting means reaching count K, which is a count of K×N clock pulses.

6. An imaging system according to claim 5, wherein said processing means includes a digital computer having an operator's console, said memory means, and input means;

a "handshake" circuit having synchronizing inputs from the digitizer and a computer ready input from the computer, and circuit means to provide a flag signal to the computer when a data frame is complete;

the input means including a data input program which creates a storage array in the memory means to receive K×M×N pixels of data and additional arrays to accept a file identifier and to relocate needed resident subroutines, which then accept the K×M×N pixel values from the digitizer, which requests an operator to specify a name to identify the new data file, and which then stores the name when entered.

7. An imaging system according to claim 6, wherein said computer includes an imaging program which operates with the display generator and the data in said storage arrays to perform intensity noramlization routines and assemble a picture for one frame, including said grey scale which divides the difference between the darkest (coldest) and brightest (hottest) regions of the scene into a predetermined number of levels of intensity.

8. An imaging system according to claim 7, wherein said processing means operating with said imaging program comprises means for reserving memory storage space for pixel data, address arrays, and frame identification arrays;

means for creating a working file and retrieving a set of K×M×N digitizer values stored under the file name entered by the operator;

means for providing for autologging if requested by an entry by the operator;

means for entering a choice of columns between which pixel values are averaged, which permits selection of a region of the displayed scene which contains background radiance having minimal intensity variation, detector values for all pixels scanned by each of said detectors between the selected columns being summed and divided by the numbers of values summed, which gives an average background value seen by the N individual detectors, a median intensity value being subtracted from each averaged background value to give an offset value, the offset values being listed on the log printout, whereby all pixel values of the frame are normalized to a common background level, and also the values of maximum and minimum brightness are forced to fall between the display generator's maximum and minimum display range capability;

means for causing scan lines to be assembled into a correctly sequenced image, and for manipulating the scan lines to give the correct vertical alignment;

wherein following operation of said means for causing all pixel brightness values to be surveyed and the maximum and minimum values to be identified and displayed at the operator's console and permitting different values to be entered, entry of different limits causes the image to be displayed with all values between these limits to be displayed on an expanded or reduced scale as is mathematically appropriate, so that the image has an altered dynamic range of intensity enabling the operator to enhance weak detail within the image, the new maximum and minimum values entered by the operator being listed if autologging is in effect;

means for causing the pixel values to be raised or lowered as required to keep them within the display generator's dynamic range capability, means to create said grey scale; and means to create return to the starting point of the program for entry of a new file name, so that an operator may analyze as many files in as many variations of dynamic range as he may choose and to do so in a continuous manner.

9. An imaging system according to claim 8, wherein M=10, N=6, and K=100.

10. An imaging system according to claim 1, 3 or 8, wherein said means for displaying is a television monitor.

11. An imaging system according to claim 1, 3 or 8, further including a recorder which is first coupled to said infrared scanner and operated to record said analog signals and sync signals;

said recorder being later coupled to said digitizer and operated in a playback mode to supply said analog signals and sync signals.

12. An imaging system according to claim 11, wherein said means for displaying is a television monitor.

13. The method of forming images comprising the steps:

scanning an object with an infrared scanner to produce analog signals of pixels in frames;

digitizing the analog signals; storing a frame of the digital signals;

processing the frame of digital signals; and displaying an image of the frame;

wherein said processing includes causing all pixel brightness values to be surveyed and the maximum and minimum values to be identified, causing said maximum and minimum values to be displayed at an operator's console and permitting entry of different values, and creating a grey scale as part of the display frame;

whereby the method is capable of generating calibrated quantitative imagery which may be utilized as a diagnostic tool for the analysis of heat flow from surfaces.

14. The method of claim 13, further including an intermediate step of recording the analog signals on a record medium, the analog signals being later read from the record medium for said digitizing step.

15. An infrared imaging system comprising:

an infrared scanner including a linear array of N detectors which receive infrared radiation from a scene and produce analog signals for a plurality of individual pixels in frames with a scanning raster, including sync signals, with means to provide N×M scan lines in the raster;

a digitizer comprising N A/D conversion devices which receives said analog signals and sync signals and produces corresponding digital signals, providing a digital value for each pixel which is a function of the infrared intensity from said object, and timing means which includes counting means controlled by said sync signals to divide each line of the raster into K pixels;

processing means including a digital computer having an operator's console, memory means, input means, and a display generator, for storing and processing a frame of the digital signals to create a display frame;

means for displaying said display frame as an image of said scene;

the input means including a data program which creates a storage array in the memory means to receive $K \times M \times N$ pixels of data, which then accepts the $K \times M \times N$ pixel values from the digitizer;

wherein said computer includes an imaging program which operates with the display generator and the data in said storage arrays to perform intensity normalization routines and assemble a picture for one frame, including a grey scale which divides the differences between the darkest (coldest) and brightest (hottest) regions of the scene into a predetermined number of levels of intensity;

wherein said processing means operating with said imaging program comprises means for reserving memory storage space for pixel data, address arrays, and frame identification arrays;

means for creating a working file and retrieving a set of $K \times M \times N$ digitizer values stored under the file name entered by the operator;

means for providing for autologging if requested by an entry by the operator;

means for entering a choice of columns between which pixel values are averaged, which permits selection of a region of the displayed scene which contains background radiance having minimal intensity variations, detector values for all pixels scanned by each of said detectors between the selected columns being summed and divided by the number of values summed, which gives an average background value seen by the N individual detectors, a median intensity value being subtracted from each averaged background value to give an offset value, the offset values being listed on the log printout, whereby all pixel values of the frame are normalized to a common background level, and also the values of maximum and minimum brightness are forced to fall between the display generator's maximum and minimum display range capability;

means for causing scan lines to be assembled into a correctly sequenced image, and for manipulating the scan lines to give the correct vertical alignment;

means for causing all pixel brightness values to be surveyed and the maximum and minimum values to be identified and displayed at the operator's console and permitting different values to be entered, entry of different limits causing the image to be displayed with all values between these limits being displayed on an expanded or reduced scale as is mathematically appropriate, so that the image has an altered dynamic range of intensity enabling the operator to enhance weak detail within the image, the new maximum and minimum values entered by the operator being listed if autologging is in effect; and means for causing the pixel values to be raised or lowered as required to keep them within the display generator's dynamic range capability, and means to create said grey scale.

16. An imaging system according to claim 15, wherein said data input program includes means effective after accepting pixel values from the digitizer, for requesting an operator to specify a name to identify the new data file, and for then storing the name when entered;

and wherein said imaging program includes means at the end for causing return to the starting point of the program for entry of a new file name, so that an operator may analyze as many files in as many variations of dynamic range as he may choose and to do so in a continuous manner.

* * * * *